J. A. WINTROATH.
BEARING.
APPLICATION FILED OCT. 17, 1916.

1,268,907.

Patented June 11, 1918.

Inventor:—
John A. Wintroath
By
Atty.

UNITED STATES PATENT OFFICE.

JOHN A. WINTROATH, OF LOS ANGELES, CALIFORNIA, ASSIGNOR TO LAYNE & BOWLER CORPORATION, A CORPORATION OF CALIFORNIA.

BEARING.

1,268,907.     Specification of Letters Patent.     Patented June 11, 1918.

Application filed October 17, 1916. Serial No. 126,104.

*To all whom it may concern:*

Be it known that I, JOHN A. WINTROATH, a citizen of the United States, residing at Los Angeles, county of Los Angeles, State of California, have invented a new and useful Bearing, of which the following is a specification.

This invention relates to that class of heavy duty bearings in which the thrust is supported by a plate which revolves on a confined body of fluid pumped in under pressure, and one of the principal objects of the invention is to minimize or eliminate wear on the parts which confine the fluid so that the bearing will stand up practically indefinitely and will not be the source of continual trouble, due to leakage, as is common in other bearings of this class.

Figure 1:
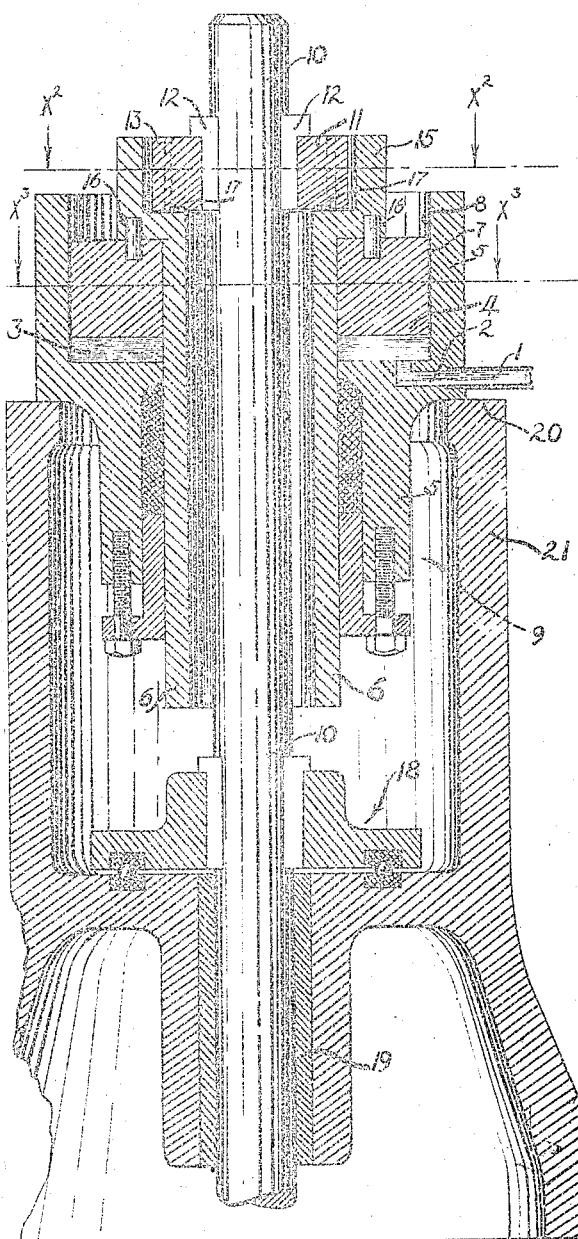
Figure 2:
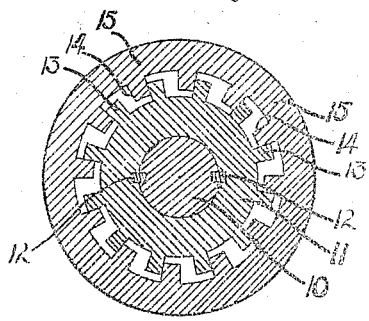
Figure 3:
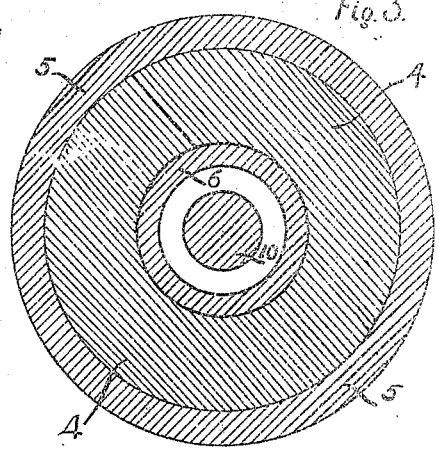

The figures illustrate one form of the invention. Figure 1 is a longitudinal section through the construction. Fig. 2 is a transverse section on line $X^2$—$X^2$ Fig. 1, and Fig. 3 is a similar section on line $X^3$—$X^3$ of Fig. 1.

The fluid is pumped under pressure through pipe 1 and aperture 2 into the chamber 3, this chamber being bounded above by plate 4, and below and on the sides by member 5 and sleeve 6 respectively. In order to prevent or minimize leakage from chamber 3 the outer cylindrical surface 7 of plate 4 and the inner cylindrical surface 8 of member 5 are machined and ground so as to fit each other very accurately. This fit is of such a character that the plate or piston 4 can rotate freely within member 5, and can move up and down therein, but is nevertheless sufficiently snug so that no appreciable leakage of the fluid can occur through the joint. This latter feature is aided somewhat by giving plate 4 an adequate height as indicated in Fig. 1. Also, in order to eliminate leakage past the joint formed by member 5 and sleeve 6 the former member is provided with an ordinary stuffing box 9 which packs off the leakage in this direction.

From the foregoing it will therefore be understood that if the original machine work is well done, the fluid pumped into chamber 3 will be effectively confined therein and will have a practically constant pressure, because the leakage, if any, is controlled perfectly, so that this fluid is in admirable condition for supporting plate 4 to which most of the shaft thrust is imparted. Of course in the usual mode of operation plate 4 revolves with the shaft, and, unless special provision is made, the ordinary deflections and vibrations of the shaft transversely would cause member 4 to press and rub hard on member 5, and as a result the accurate surfaces 7 and 8 would rapidly wear themselves out of true. If this were permitted to happen the fluid would leak out copiously from chamber 3 and would destroy the efficacy of the bearing in a very short time. It is against this result that this invention is directed, and the principal object of the invention is therefore to eliminate the wear referred to, and consequently the resulting leakage, and this I accomplish by so connecting the shaft to plate 4 that these two members rotate with each other in the usual manner and yet that the shaft has a freedom of transverse motion within the plate, so that the plate is not affected in any way by the deflections or vibrations of the shaft, with the result that the plate always runs evenly in member 5, and the surfaces 7 and 8 never press unduly on each other no matter how severe may be the vibration or deflection of the shaft from normal. Obviously such an arrangement preserves the integrity of the fit between surfaces 7 and 8 practically indefinitely, and this type of bearing is among the most efficient and durable of its class, and the leakage is at all times inappreciable. Of course the mechanism for connecting the shaft and the plate in the manner indicated can be varied extensively, both as to details of form and location, but in order to illustrate the practicability of this invention I will now describe in detail one form of connection which may be used.

By reference to Figs. 1 and 2 it will be seen that the shaft 10 is keyed to a member 11 by means of keys 12. This member 11 is equipped with strong teeth 13 which register with similar teeth 14 projecting inward from the housing 15 of sleeve 6, within which member 11 operates. By reference to Fig. 2 it will be seen that the spacing between teeth 13, and between teeth 14, is such that member 11 is free to float in any direction transversely in the housing 15 and still have some of the teeth 13 engage some of the teeth 14. In this way the member 15 and plate 4 are compelled at all times to rotate in practical unison with the shaft, even though the shaft is perfectly free to vibrate or deflect transversely within housing 15, without this housing or plate 4 being in any way affected by such vibrations or deflections, that is, the ordinary impulses of the shaft will not cause the ground surfaces 7 and 8 to press on and wear each other out locally. These surfaces will run smoothly in each other at all times without appreciable wear, even though the shaft vibrate and deflect seriously from normal, and in this way the utility of this type of bearing is enhanced so greatly as to make it one of the best bearings known in commerce.

Of course the housing 15 is connected to plate 4 in some suitable manner as by pins 16, and in order to facilitate the transverse motion of member 11 in housing 15 some suitable ball bearing system such as is indicated at 17 may be inserted between these members.

Also, an auxiliary mechanical bearing 18 may be used as an aid to the fluid operated bearing, especially in cases of emergency, as when an excessive load is on the shaft or when the fluid pressure in chamber 3 falls off for some reason. Furthermore a bearing like bearing 19 should also be used, and should be located reasonably close to the fluid operated bearing, so as to effectively resist vibrations or deflections of the shaft and prevent their amplitude becoming too large. However, it is of course understood that bearings like 19 cannot wholly eliminate vibrations, no matter how numerous and accurate the bearings are, and therefore I have devised the idea of a flexible or full floating arrangement such as is illustrated above, for preventing the resulting shaft vibrations being carried through to surfaces 7 and 8, and this added feature is very helpful in practice. Also, a good alinement can be easily obtained between the center lines of surfaces 7 and 8, and the bearing 19, by virtue of the fact that member 5 can be shifted around sidewise on surface 20 of casting 21 without any trouble, especially when the pressure is released in chamber 3, and in this way the alinement between these bearings is almost automatic, although this is not of such great consequence in view of the lateral freedom which the shaft has anyway in sleeve 6 and plate 5. Except for the many modifications to which this invention is subject, this now completes a description thereof.

Claims:

1. In combination, a vertical revoluble shaft, a fluid operated bearing therefor including a stationary and a revoluble member, the joint between the stationary and revoluble member being made substantially fluid tight, the said shaft passing through the revoluble member of the fluid operated bearing and having freedom of transverse motion therein, and a connection between the shaft and the revoluble member for causing these two elements to revolve in substantial unison with each other.

2. In combination, a vertical revoluble shaft, and a fluid operated bearing therefor including a stationary and a revoluble member, the joint between the stationary and revoluble member being made substantially fluid tight, and the said revoluble member being loosely connected to the shaft so that the revoluble member and the shaft are compelled to revolve in substantial unison with each other but so that the shaft nevertheless has freedom of transverse motion within the revoluble member, which motion the revoluble member is not compelled to follow.

3. In combination, a vertical revoluble shaft, a fluid operated bearing therefor including a stationary and a revoluble member, the stationary and revoluble members being accurately machined so as to fit each other along a fluid tight joint, the said shaft passing through the revoluble member and having freedom of transverse motion therein, and a loose connection between the shaft and the revoluble member including projections or teeth interlocking each other loosely for causing the shaft and revoluble member to revolve in substantial unison with each other.

In testimony whereof, I have hereunto set my hand at Los Angeles, county of Los Angeles, State of California, this 2nd day of October, 1916.

JOHN A. WINTROATH.